July 3, 1923.

W. E. CRAWFORD

SPRING WHEEL

Filed Jan. 11, 1923

1,460,889

3 Sheets-Sheet 1

Inventor
W. E. Crawford

By
[signature]
Attorney

July 3, 1923.

W. E. CRAWFORD

SPRING WHEEL

Filed Jan. 11, 1923

1,460,889

3 Sheets-Sheet 2

Inventor
W. E. Crawford

By
[signature]
Attorney

July 3, 1923.

W. E. CRAWFORD

SPRING WHEEL

Filed Jan. 11, 1923

1,460,889

3 Sheets-Sheet 3

Inventor
W. E. Crawford

Patented July 3, 1923.

1,460,889

UNITED STATES PATENT OFFICE.

WILLIAM E. CRAWFORD, OF HAVRE, MONTANA.

SPRING WHEEL.

Application filed January 11, 1923. Serial No. 612,061.

*To all whom it may concern:*

Be it known that I, WILLIAM E. CRAWFORD, a citizen of the United States, residing at Havre, in the county of Hill and State of Montana, have invented certain new and useful Improvements in Spring Wheels; and I do hereby declare the following to be a full, clear, and exact description of the invention, such as will enable others skilled in the art to which it appertains to make and use the same.

This invention has relation to certain new and useful improvements in spring wheels and has for its primary object the provision of a new form of spring wheel comprising a few number of parts, and which includes spokes and a resilient mounting therefor disposed between a pair of side plates, the spokes having rigid connection with the hub to move therewith, said hub being provided with spindle projections on opposite side faces for mounting of the wheel in suitable bearings.

The invention has for another object the provision of a spring wheel of the character stated in which the spokes mounted rigidly on and extending radially from the hub have a circumferential movement in each direction for a limited distance, thereby permitting the hub to be resiliently suspended in the side plates of the wheel.

The invention has for a further object the provision of a spring wheel of the character stated in which the inner and outer side plates may be readily assembled with the hub and the spokes to hold the cushioning springs for the spokes in proper position, one of the outer side plates being adapted to have the brake drum mounted thereon.

The invention has for a still further object the provision of a resilient wheel of the character stated which may be utilized for various purposes, owing to the peculiar construction and arrangement of the component parts.

Figure 1:
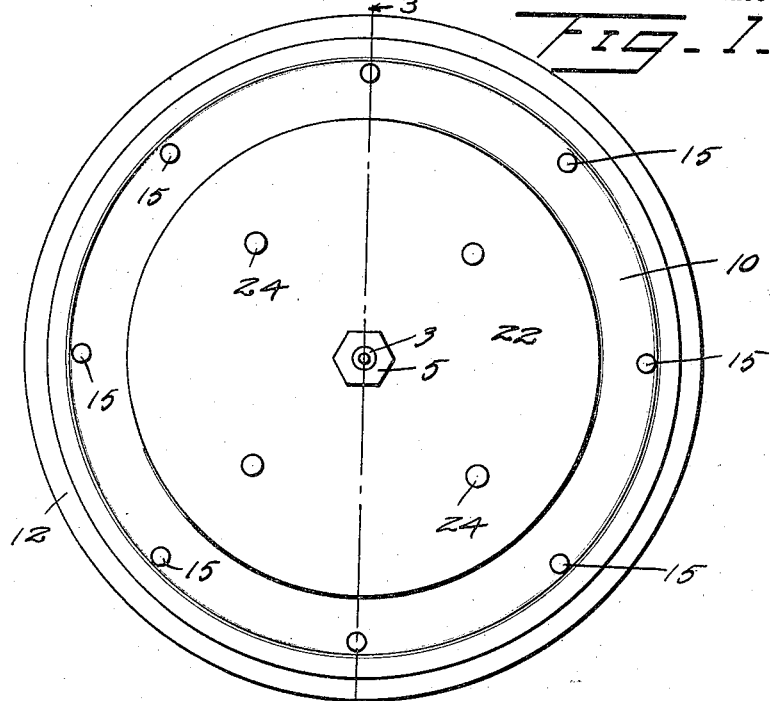
Figure 2:
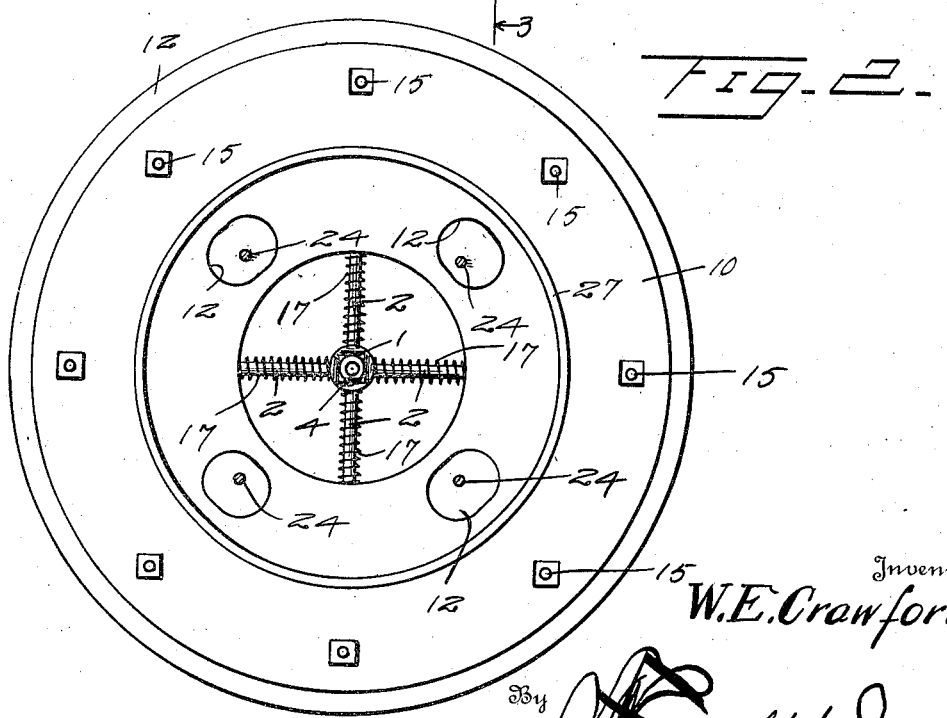
Figure 3:
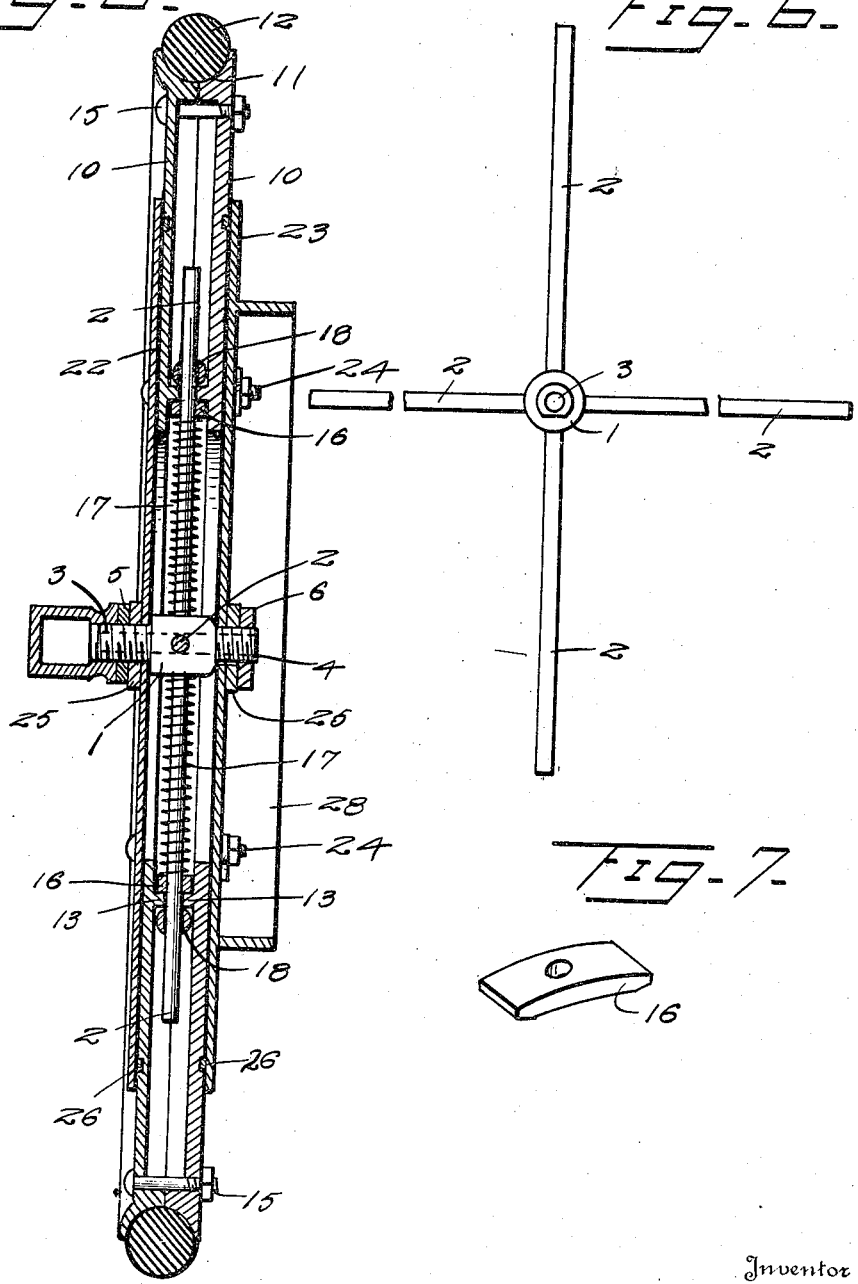
Figure 4:
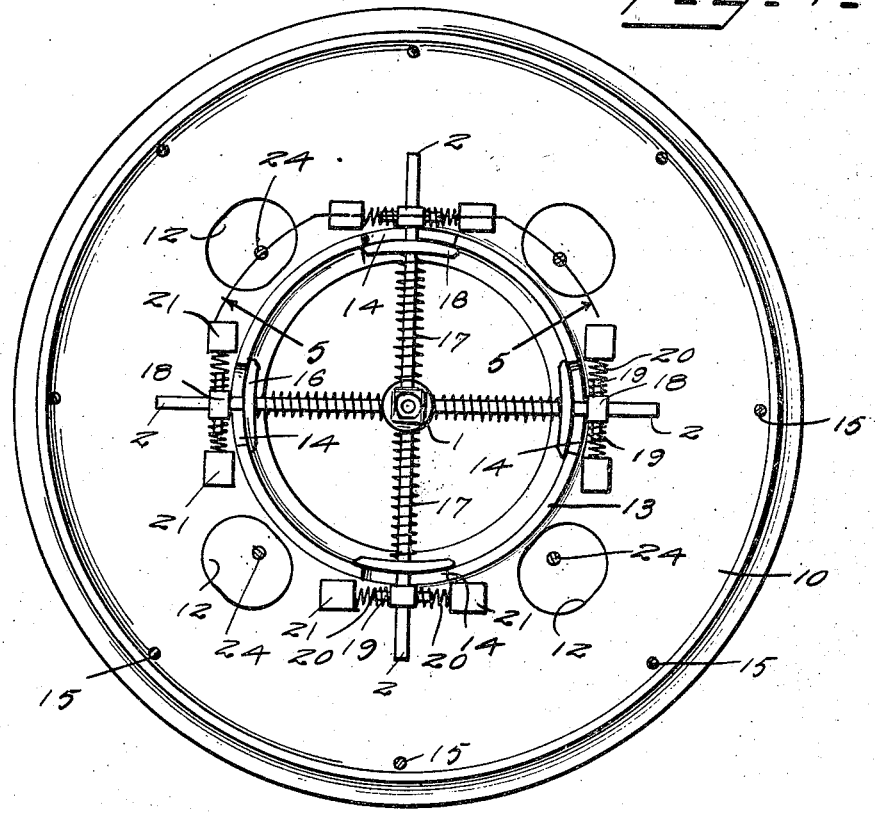
Figure 5:
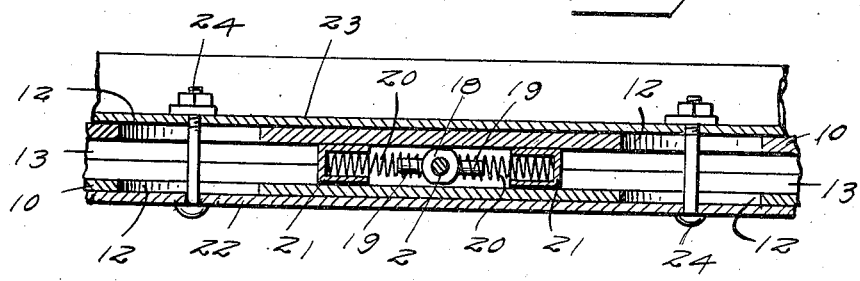

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:

Figure 1 is an elevation of a spring wheel constructed in accordance with the invention, Figure 2 is a similar view of the opposite side thereof, the side plate being omitted and bolts connecting opposite side plates being in section, Figure 3 is a vertical section through the wheel on the line 3—3 of Figure 1, the parts being shown on a larger scale, Figure 4 is an elevation of one half of the wheel as seen from the inner side, the bolts connecting the two halves being in section, Figure 5 is a detail section on the line 5—5 of Figure 4, looking in the direction indicated by the arrows, Figure 6 is a detail view of the hub and the attached spokes, and Figure 7 is a detail view of one of the blocks loosely mounted on each of the spokes.

Referring more in detail to the drawings in which similar reference characters designate corresponding parts throughout the several views, 1 indicates the hub and 2 the spokes extended radially therefrom. While any number of spokes may be employed, the wheel is shown as having four spokes equally spaced from one another. The hub also has spindle extensions 3 and 4. Suitable lock nuts 5 and 6 are provided on the extreme outer ends of said spindle extensions 3 and 4 respectively.

The wheel includes a pair of spaced side disks or plates 10 which have their outer peripheral portions brought together and shaped to provide a seat 11 in which is fitted a tire 12. The disks or plates 10 form the sides of the wheel and therefore may be referred to as the inner and outer side disks or plates.

The side disks or plates 10 have openings 12 in coincident relation and inner registering annular flanges 13 which are cut away at intervals, as shown at 14, to provide clearance for the spokes 2. Bolts 15 connect the plates 10.

Mounted slidably on each of the spokes 2 is a block 16 which is disposed to engage the inner face of the flanges 13. An expansible helical spring 17 is mounted on each spoke 2 between the hub 1 and block 16 and normally urges the block outward and holds it in engagement with the flanges 13. The projecting ends of the spokes 2 receive blocks 18 which are loose thereon and have opposite extensions 19. Expansible helical springs 20 are interposed between the blocks 18 and abutments 21 carried by one of the plates 10. These abutments 21 are hollow and receive one end of the respective springs 20, the other end of said springs receiving an extension 19. In this manner the plates 10 are normally held in a given position with reference to the spokes and are yieldable in either direction to admit of the springs 17 functioning to compensate for shock and vibration.

Engaged against the outer faces of the disks or plates 10, are the outer central side plates 22 and 23, which are connected by bolts 24 passing through the openings 12. The plates 22 and 23 receive the spindle extensions 3 and 4 and are held thereon by nuts 25 and the lock nuts 5 and 6. Packing 26 is interposed between the plates 10 and 22 and 23 and is preferably fitted in an annular groove 27 formed in the outer side of the plates 10. The inner plate 23 carries a brake drum 28.

From the foregoing paragraphs taken in connection with the accompanying drawings, it will be evident that I have provided a spring wheel which will be of simple construction as well as highly efficient in use and which may be employed for various purposes for which the spring wheel is adapted.

While the preferred embodiment of the invention has been shown and described, it will be understood that minor changes in the details of construction and arrangement of parts may be resorted to within the scope of what is claimed without departing from the spirit of the invention.

What is claimed is:

1. A spring wheel comprising main side discs or plates having central openings, a hub positioned in said central openings, spokes carried by said hub, blocks slidably mounted on said spokes, means to resiliently retain said blocks in normal position upon said spokes, means carried by the disks to resiliently retain said blocks in central position, and side central closing plates mounted on said hub and secured against said first mentioned central plates.

2. A spring wheel comprising connected spaced side plates, a tire mounted on the peripheral portion of said plates, said side plates having flanges formed thereon, a portion of each flange being cut away, a hub movable between said side plates, spokes extended radially from said hub and passing through the cut away portions of the flanges, blocks mounted slidably on said spokes and engaging the inner faces of said flanges, means for resiliently forcing said blocks outwardly into engagement with said flanges, blocks loosely mounted on the projecting ends of the spokes and means yieldably connecting the outer blocks with the discs to admit of relative circumferential movement of the discs in either direction.

3. A spring wheel comprising side plates, a hub positioned between said side plates and having spindle extensions, central side plates mounted on said spindle extensions and having sliding engagement with the outer faces of the first mentioned plates, means for connecting the central side plates and having play relative to the main side plates, spokes radiating from the hub, blocks on the spokes, springs between the hub and blocks to normally press the blocks outwardly, means on the main plates to limit the outward movement of the blocks, other blocks loose on the outer ends of the spokes, and lateral springs between the outer blocks and the main side plates to yieldably hold the parts in normal position.

4. A spring wheel comprising connected spaced side plates, said side plates having flanges formed thereon, a portion of each flange being cut away, a hub movable between said side plates, spokes extending radially from said hub and passing through the cut-away portions of the flanges, blocks mounted slidably on said spokes and engaging the inner faces of said flanges, and means for resiliently forcing said blocks outwardly into engagement with said flanges.

5. A spring wheel comprising connected spaced side plates, said side plates having flanges formed thereon, a portion of each flange being cut away, a hub movable between said side plates, spokes extending radially from said hub and passing through the cut-away portions of the flanges, blocks mounted slidably on said spokes and engaging the inner faces of said flanges, means for resiliently forcing said blocks outwardly into engagement with said flanges, blocks loosely mounted on the projecting ends of the spokes, blocks carried by the disk and arranged at opposite sides of the outer spoke-carried blocks, and coil springs yieldingly connecting the outer spoke-carried blocks with the disk-carried blocks to admit of relative circumferential movement of the disks in either direction.

In testimony whereof I affix my signature in presence of two witnesses.

WILLIAM E. CRAWFORD.

Witnesses:
 FRED. C. WALKER,
 CHARLES J. CRAWFORD.